United States Patent [19]
Sartor

[11] 3,798,593
[45] Mar. 19, 1974

[54] VEHICLE CURVE SPEED WARNING DEVICE

[76] Inventor: Raymond A. Sartor, 1518 Zuni, Pueblo, Colo. 81001

[22] Filed: June 30, 1972

[21] Appl. No.: 268,206

[52] U.S. Cl............... 340/52 H, 340/62, 200/61.45
[51] Int. Cl............................................. B60q 5/00
[58] Field of Search ..... 340/52 H, 62, 63, 65, 52 R, 340/53, 262, 263, 264; 200/61.45, 61.52, 61.44, 61.46, 80; 303/6, 24; 188/152

[56] References Cited
UNITED STATES PATENTS

| | | | |
|---|---|---|---|
| 2,474,610 | 6/1949 | Wunsch | 340/263 |
| 1,266,551 | 5/1918 | Carstensen | 340/263 |
| 2,075,040 | 3/1937 | Kieber | 340/52 H |
| 3,398,991 | 8/1968 | Compton | 200/61.45 R X |

*Primary Examiner*—Alvin H. Waring
*Attorney, Agent, or Firm*—Berman, Bishoff & Platt

[57] ABSTRACT

A device is described which provides a visual and audible warning when a vehicle on which it is mounted exceeds a predetermined speed when going around a curve. The device comprises a double potentiometer switch actuated by a pendulum contact arm which acts under the influence of centrifugal force to vary the resistance in circuit with a warning light. The greater the speed of the vehicle in making the turn, the further the contact arm will move along the resistance, decreasing the total resistance in circuit with the lamp, causing it to glow more brightly. When the contact arm passes a predetermined point on either the left resistance or the right resistance, a pushbutton switch will be closed, actuating a buzzer, indicating that the safe speed has been exceeded. The pendulum actuated contact arm is adjustably mounted so that depending upon the particular application to which the device is put, the buzzer can be made to sound at a preselected point, representing the safe speed for any particular curve.

11 Claims, 4 Drawing Figures

PATENTED MAR 19 1974 3,798,593

VEHICLE CURVE SPEED WARNING DEVICE

This invention relates to safety warning devices and more particularly relates to a curve speed warning device for vehicles such as automobiles.

In today's safety conscious era, when automobile manufacturers in particular are paying more and more attention to the installation of safety devices in the vehicles which they produce, relatively little attention has been paid to the problem of excessive speed as a safety factor. While certain automobiles have been equipped with devices which emit a warning signal when a predetermined speed is exceeded, such devices do not provide an indication of relative safety based on road conditions, such as curves with relation to speed, but rather, are actuated simply by the absolute speed of the vehicle. Quite clearly, a crucial factor in determining the safety of the speed at which the vehicle is being driven is the relation of such speed to road conditions such as curves. Yet, there is no known device which provides such an indication.

Accordingly, it is a principal object of this invention to provide a safety device for vehicles which provides a relative indication of the safety factor in the vehicle's speed as it is making a turn on a curve or the like.

Another object of the present invention is to provide a safety device for vehicles which emits a graduated visual indication of the safety factor in the vehicle's speed as it is making a turn.

Yet another object of the present invention is to provide an audible warning in a safety device of the type described when the speed of the vehicle exceeds a predetermined limit for the turn being made by the vehicle.

Briefly, the present invention comprises a pendulum actuated double potentiometer having left and right portions. The contact arm of the potentiometer sweeps along the left resistive portion when the vehicle is making a left turn, and similarly sweeps along the right resistive portion when the vehicle is making a right turn. Depending upon the speed of the vehicle in relation to the sharpness of the turn or curve, the contact arm will assume a position along the resistance which is in series with a lamp to cause the lamp to glow increasingly more brightly as the operation of the vehicle becomes less safe. When the speed of the vehicle exceeds a predetermined value for a given turn or curve in the road, camming members mounted on the pendulum actuated contact arm will depress a pushbutton switch which, in turn, applies battery voltage to a buzzer, emitting an audible signal. The pendulum actuated contact arm may be adjustably mounted so that the relative safety factor at which the buzzer will be sounded can be varied.

These and other objects, advantages and features of the present invention will be better appreciated by a consideration of the following detailed description taken in conjunction with the drawings in which.

Figure 1:
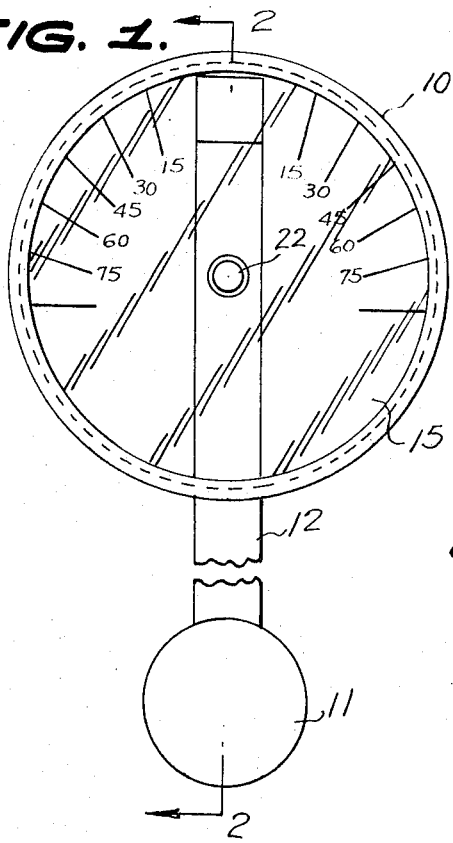
FIG. 1 is a front elevation of the safety warning device of the present invention as it might be mounted on a vehicle dashboard in a self-contained unit.
Figure 2:
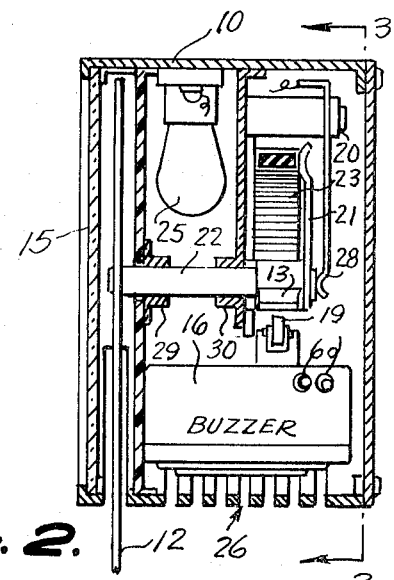
FIG. 2 is a sectional view taken on the line 2—2 in FIG. 1 looking in the direction of the arrows.
Figure 3:
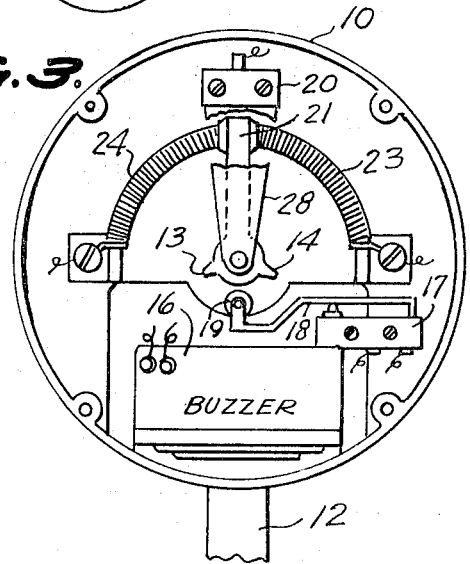
FIG. 3 is a sectional view taken on the line 3—3 in FIG. 2 looking in the direction of the arrows.

Referring now to FIGS. 1, 2 and 3 of the drawing, one possible mechanical arrangement of the components of the invention is illustrated. As shown in FIG. 1, substantially cylindrical casing 10 has a front face 15 formed of a transparent or translucent material such as any of the common plastics. Inscribed on face 15 are indicia representing the relative safety factor of speed in relation to sharpness of curve. As can be seen, there are identical sets of indicia to the left and to the right of pendulum arm 12 which also serves as an indicator and can be readily seen through face 15.

Attached to one end of pendulum arm 12 is spherical pendulum weight 11; mounting pendulum arm 12 within casing 10 is substantially cylindrical member 22 which is rotatably mounted in bearing members 29 and 30. Fixedly secured to the other end of member 22 is contact arm 21 of potentiometer 20 which comprises left resistive segment 23 and right resistive segment 24. Thus, as pendulum 11 swings to the left as viewed in FIG. 1 when the vehicle is taking a curve to the right, contact arm 21 will be moved along right resistive segment 24. Similarly, when the vehicle is taking a curve to the left, pendulum weight 11 will swing to the right as viewed in FIG. 1; and contact arm 21 will move along left resistive segment 23.

Battery contact arm 28 is in electrical contact with the base of contact arm 21. Mounted on the end of member 22 for rotation therewith are left cam member 13 and right cam member 14, disposed in proximity to cam follower 19. When cam follower 19 is contacted by either cam member 13 or 14, actuator 18 of pushbutton or microswitch 17 is depressed; and the switch is closed.

Buzzer 16 is mounted just above grillwork 26 for conveying the sound of the buzzer to the driver of the vehicle. As will be explained in connection with the electrical diagram in FIG. 4, closure of switch 17 actuates buzzer 16.

Figure 4:
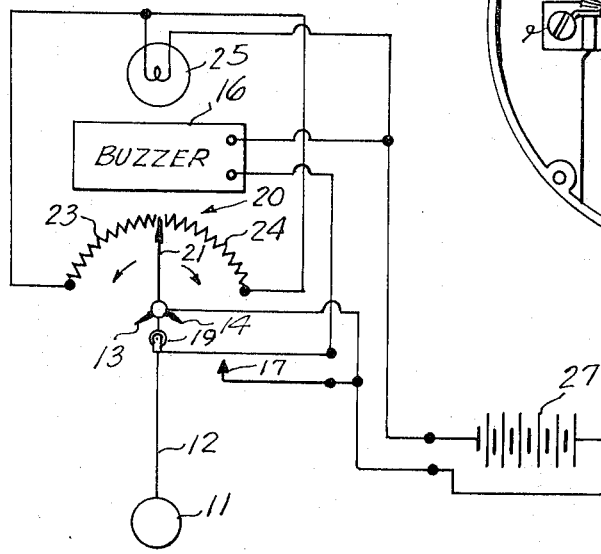
FIG. 4 is an electrical schematic diagram showing the interconnection of the electrical components of the invention.

Referring now to FIG. 4, it can be seen that left resistive segment 23 and right resistive segment 24 of double potentiometer 20 are electrically separated so that when contact arm 21 is in the neutral position as shown, lamp 25 is electrically disconnected from vehicle battery 27. However, when contact arm 21 commences swinging to the left or to the right, depending upon the type of curve which the vehicle is taking under the influence of pendulum arm 12 and pendulum weight 11, lamp 25 will be interconnected with battery 27, causing the lamp to glow. As contact arm 21 moves further to the left or to the right, as the case may be, increasingly smaller resistance will be in the series circuit comprising either the left resistive segment 23 or right resistive segment 24, lamp 25 and battery 27. Accordingly, as the pendulum swings further to the right or to the left, lamp 25 will glow more brightly. This will provide a visual indication to the driver of the vehicle that a danger point is being reached. When a point is reached beyond which further speed is unacceptable from a safety standpoint, either cam member 13 or 14 will contact cam follower 19 and close switch 17, completing the series circuit between buzzer 16 and battery 27. This will then actuate the buzzer and provide an audible signal, indicating to the driver that decreased speed is immediately called for.

It should be realized that the speed at which buzzer 16 will be actuated may be adjusted by varying the length of pendulum arm 12, which is shown broken away in FIGS. 1 and 2 to indicate that its length may be adjusted by any well known mechanical expedient. Similarly, it should be realized that while the buzzer 16 is indicated as being a separate component mounted within the casing 10, it is possible to use one of the safety buzzers already installed in many automobiles.

Lamp 25 itself may be colored, either red or amber, for example, or face 15 may be appropriately colored so that as lamp 25 glows increasingly more brightly, a striking visual indication will be provided.

There has thus been described a safety warning device which provides a visual indication which grows increasingly more intense as the degree of safety at which the vehicle is being operated decreases and which provides an audible signal when a dangerous condition is imminent. It is important to recognize that the indications given by the device are always dependent on the relationship between the speed and the sharpness of the curve which the vehicle is taking. For example, if the vehicle is proceeding at 15 miles an hour around a very steep turn to the right, pendulum arm 12 might be at the right hand position marked 15 in FIG. 1, with a relatively large amount of resistance in series with lamp 25, causing it to glow dimly. However, if the same curve were taken at a speed of 45 miles an hour, pendulum arm 12 might be at the position marked 45 on the right of face 15 in FIG. 1, with a relatively small resistance in series with lamp 25, causing it to glow more brightly. Increasing the speed still further when taking the same curve would cause cam member 14 to contact cam follower 19 and close switch 17, actuating buzzer 16, as explained above. By the same token, if a relatively gradual curve were taken at a speed of 45 miles an hour, pendulum arm 12 might be only in the position marked 15 in FIG. 1 and lamp 25 would glow dimly, indicating a relatively safe condition.

While one specific embodiment of the invention has been shown and described, it is contemplated that the various modifications of the present invention will be readily apparent to those skilled in the art; and it is therefore intended that the scope of the invention be limited only by the claims appended hereinbelow.

I claim:

1. A safety signalling device for a turning vehicle comprising:
   a. electrical signalling means mounted within said vehicle for indicating to the driver of said vehicle the relative safety of the turning speed of said vehicle;
   b. centrifugal force actuated means rotatably mounted in said vehicle;
   c. a source of electrical energy connected to said electrical signalling means; and
   d. means actuated by said centrifugal force means for varying the quantity of electrical energy supplied to said electrical signalling means and thus varying the signal emitted thereby in relation to the relative safety of the turning speed of said vehicle.

2. The safety signalling device set forth in claim 1 wherein said centrifugal force actuated means comprises a pendulum having an arm and a weight and said means actuated by said centrifugal force means comprises variable resistance means linked to said pendulum arm.

3. The safety signalling device set forth in claim 2 wherein said variable resistance means comprises a potentiometer having its contact arm linked to said pendulum arm, so that increasing centrifugal force exerted on said vehicle will result in decreasing resistance and increasing electrical energy supplied to said electrical signalling means.

4. A safety signalling device for turning vehicles comprising:
   a. centrifugal force actuated means comprising a pendulum having an arm and a weight;
   b. visual electrical signalling means connected to a source of electrical energy;
   c. means actuated by said centrifugal force means comprising a potentiometer electrically connected to said signalling means and having its contact arm linked to said pendulum arm;

so that increasing centrifugal force exerted on said vehicle as it turns will result in decreasing resistance and increasing electrical energy supplied to said signalling means and a proportionate increase in the intensity of the indication provided by said signalling means.

5. A safety signalling device for vehicles comprising:
   a. centrifugal force actuated means comprising a pendulum having an arm and a weight;
   b. electrical signalling means connected to a source of electrical energy;
   c. means actuated by said centrifugal force means comprising a potentiometer having left and right resistive segments, electrically unconnected to each other, said potentiometer being electrically connected to said signalling means and having its contact arm linked to said pendulum arm;

so that increasing centrifugal force exerted on said vehicle will result in decreasing resistance and increasing electrical energy supplied to said electrical signalling means.

6. The safety signalling device set forth in claim 5 wherein said centrifugal force is caused by said vehicle's making a turn and said electrical signalling means comprises a visual indicator electrically connected to said potentiometer, so that increasing centrifugal force results in a proportionate increase in the intensity of the indication provided by said visual indicator.

7. The safety signalling device set forth in claim 6 including means for mounting said pendulum so that said contact arm contacts said right resistive segment when said vehicle is making a right turn and said left resistive segment when said vehicle is making a left turn.

8. The safety signalling device set forth in claim 4 further including audible signalling means for providing an audible signal when said centrifugal force exceeds a predetermined limit.

9. The safety signalling device set forth in claim 8 further including means linked to said pendulum for actuating said audible signalling means when said pendulum undergoes a predetermined displacement under the influence of said centrifugal force.

10. The safety signalling device set forth in claim 7 further including audible signalling means for providing an audible signal when said centrifugal force exceeds a predetermined limit.

11. The safety signalling device set forth in claim 10 further including means linked to said pendulum for actuating said audible signalling means when said pendulum undergoes a predetermined displacement under the influence of said centrifugal force.

* * * * *